Aug. 5, 1969  MINORU JOTOKU ET AL  3,459,511
EXOTHERMIC CATALYTIC REACTION APPARATUS
Filed Aug. 23, 1965  4 Sheets-Sheet 4

United States Patent Office 3,459,511
Patented Aug. 5, 1969

---

3,459,511
EXOTHERMIC CATALYTIC REACTION APPARATUS
Minoru Jotoku, Shinya Naka, and Naohiko Inada, Niigata-shi, Japan, assignors to Japan Gas-Chemical Company, Inc., Tokyo, Japan
Filed Aug. 23, 1965, Ser. No. 481,475
Int. Cl. B01j *9/16*
U.S. Cl. 23—289                                    11 Claims

ABSTRACT OF THE DISCLOSURE

A self-heat exchange type apparatus suitable for use in an exothermic, catalytic, gaseous reaction of the synthesis of ammonia, methanol, etc., comprising a double tube system where a plurality of cooling tubes are provided in a catalytic layer, said cooling tubes being arranged in counter-flow type and parallel-flow type in alternate and symmetrical manner and each of said cooling tubes consisting of inner and outer tubes, said inner tube being closed at one end and having openings provided at different relative positions in the longitudinal direction at suitable intervals, whereby the amount of feed gas running through a passage formed between the inner and outer tubes is redirected longitudinally, and the temperature distribution is made uniform throughout the catalyst layer.

---

The president invention relates to a self-heat exchange type reaction apparatus for use in an exothermic catalytic reaction in a gaseous phase, and in particular to a reaction apparatus comprising a double tube system wherein cooling tubes incorporated in a fixed catalytic layer have small pores distributed throughout the walls of inner tubes, whereby it becomes possible to make the temperature distribution in said fixed catalyst layer uniform and to conform it to an optimum reaction temperature distribution.

By the term "self-heat exchange type reaction apparatus," as used herein, is meant a reaction apparatus where a feed gas flows through the interior of the cooling tubes and then the feed gas which has flowed out of said cooling tubes passes through a fixed catalyst layer disposed around said cooling tubes to thereby effect reaction.

Heretofore, attempts have been made, in an exothermic catalytic reaction in a gaseous phase in which a fixed catalyst layer is used, to adjust the temperature in the interior of the catalyst layer so that it is constant in order to prevent lowering of catalytic activity owing to excessive heat. However, hitherto-known reaction apparatuses of this type have not yet proved satisfactory from the standpoint of making the temperature distribution in a catalyst layer uniform. For instance, there is known in the art a self-heat exchange type reactor for gaseous phase reaction having a fixed catalyst layer in which cooling tubes are inserted, said cooling tubes being so arranged that a feed gas which flows through the tube is flowing in parallel-flow or counter-flow to a reacting gas which flows through the catalyst layer. But when a counter-flow self-heat exchange system is employed, the elevation of the temperature at the center part of the catalyst layer and the lowering of the temperature at the bottom part of the catalyst layer is disadvantageous. If, on the other hand, a parallel-flow self-heat exchange system is used, the temperature at the upper part of the catalyst layer is lowered and the temperature at the bottom portion of the catalyst layer is elevated, which is also disadvantageous. Thus, in all of these systems, it has been impossible to make the distribution of the temperature in the catalyst layer uniform.

A primary object of the present invention is to provide a reaction apparatus by which it is possible to make the distribution of temperature in a fixed catalyst layer substantially completely uniform and to adjust the temperature of the whole catalyst layer to an optimum temperature for an exothermic catalytic gaseous phase reaction such as an ammonia or methanol synthesis reaction under a high temperature and high pressure.

Another object of the present invention is to provide a self-heat exchange type reaction apparatus which will increase the yield based on the amount of catalyst thus maximising the yield based on the capacity of a reactor.

Other objects and advantages of the present invention will become apparent from the descriptions below.

These objects are achieved by a self-heat exchange type reaction apparatus in accordance with the present application comprising cooling tubes incorporated in a fixed catalyst layer, said cooling tubes each being double concentric tubes wherein the inner tubes are provided with an inlet for a feed gas at one end, are closed at the other end, and have pores or openings in the wall spaced along the tube at intervals from said inlet.

In accordance with the present invention, it is necessary that the feed gas inlet and an outlet for said cooling tubes should extend out of a fixed catalyst layer. Accordingly, the feed gas is distributed equally into the cooling tubes from outside of the fixed catalyst layer, flows out through the outlets of the cooling tubes positioned outside of the catalyst layer and is introduced into the catalyst layer from the surface of the catalyst layer. A reactor of the type wherein the inlet of the cooling tube does not extend outward of the catalyst layer and therefore feed gas is introduced into the inside of a layer is undesirable because the effective thickness of the catalyst layer is decreased.

The critical feature of the apparatus according to the present invention is the use of a system of double cooling tubes for said self-heat exchange type reaction apparatus, in which system the inner tubes each have an inlet for a feed gas at one end, are closed at the other end and have openings in the walls spaced along the tubes at intervals from said inlet. Thus, it is possible to control the heat transfer coefficient and the heat transfer temperature difference, depending upon the relative position of the cooling tubes in the catalyst encircling them.

The double cooling tube system according to the present invention further comprises an outer tube spaced from the periphery of each of the inner tubes to define an annular cross-section cooling passage between each inner tube and the corresponding outer tube and which outer tube has a feed gas outlet at the end opposite to the inlet to the inner tube. A feed gas to be reacted first flows through the inlet of the cooling tube into the inner tube and proceeds along the inner tube a certain distance. Subsequently, it emerges through the small openings provided along the entire length of the wall of the inner tube at intervals spaced from the inlet for the feed gas, flows through the annular passage between the inner tube and the outer tube and cools the catalyst layer by taking up heat transmitted through the wall of the outer tube. Hence, by using the apparatus of the present invention, it has become possible to control the cooling capacity of the cooling means in the catalyst layer by correctly choosing the position of the cooling tubes; that is to say, it has become possible to control the heat transfer coefficient and the temperature difference of the heat transfer so as to thereby decrease the difference of distribution of a reaction temperature in the catalyst layer by means of the positions of each of the cooling tubes, and by choosing a proper ratio of diameter of the outer tube to that of the inner tube, the position of the openings provided in the wall of the inner tube, and the size and the number of said openings.

The ratio of the diameter of the outer tube to that of the inner tube in the apparatus according to the invention should preferably be 0.3 to 0.8. On the other hand, the ratio of the diameter of each opening provided in the wall of an inner tube to that of the inner tube should preferably be 0.1 to 0.5. The distribution of the openings along the length of the wall of the inner tube can be determined based on experience so that openings can be closely spaced in the vicinity of a portion of the catalyst layer which is heated to a temperature in excess of an optimum temperature if a cooling tube consisting of an ordinary single tube were used but more widely spaced at the part of the catalyst layer which would ordinarily have a temperature lower than the optimum reaction temperature. As the diameter of an opening of an inner tube generally has a negative correlation with the number of the openings, it is also possible to achieve the same effect by changing the diameter of the openings instead of the number of the openings.

It is preferable that the said double cooling tubes of the system should each be straight and be inserted through the catalyst layer, or U-shaped and extend from the bottom of a catalyst layer to the upper portion and back to the bottom and project out of the bottom of the layer, or vice versa.

The above-mentioned double tubes may be used singly or in groups. In general, however, it is preferable to use a plurality of double tubes. In this case, it is preferable that an equal amount of a feed gas flow into the inlet of each cooling tube. When the outlet of the said cooling tube is positioned on the opposite side of the catalyst layer from the side of the catalyst layer at which the gas is introduced into the catalyst, it is imperative to provide a conducting passage, and preferably a central passage, by which the feed gas flowing out from the outlet of the double tube system is conducted to the side of the catalyst layer at which the gas is introduced into the catalyst.

In an embodiment of the present invention in which a straight cooling tube is used, the outlet of the double cooling tube for a feed gas is located on the side of a catalyst layer at which the gas is introduced so that gas flowing through the said cooling tube will be in counter-flow to the gas flowing through the catalyst layer.

In a preferred embodiment of the present invention, the said straight double cooling tubes are arranged alternately so as to cause the gas flowing in the cooling tube to flow in counter-flow and parallel-flow to the gas cooling tube flows in counter-flow to the reacting gas flow in the fixed catalyst layer. As used hereinafter in the specification and claims, the term "counter-flow type" refers to an arrangement wherein the gas outlet for the cooling tube is located on a gas-introducing side of a catalyst layer and the gas inlet is on the opposite side of the catalyst layer so that the feed gas flowing through the cooling tube flows in counter-flow to the reacting gas flowing through the catalyst layer. On the other hand, "parallel-flow type" refers to an arrangement wherein the gas inlet for the double cooling tube is located on the gas-introducing side of the catalyst layer and the gas outlet on the opposite side so that the feed gas flows in parallel-flow to the said reacting gas flowing through the catalyst layer. It is also preferable that the counter-flow cooling tubes and parallel-flow cooling tubes be arranged symmetrically.

In another preferred embodiment of the apparatus of the present application, the said U-shaped double cooling tubes are so arranged that the outlets and inlets of the said cooling tubes are positioned on the opposite side of the catalyst layer from the gas-introducing side. Also, the U-shaped double cooling tubes are each arranged so that the flow of fluid in each tube is in the opposite direction to the flow of fluid in the next closest tube of the said cooling tubes. In these preferred embodiments, it is not only possible to lower the temperature of that portion of a catalyst layer which is heated to excess, but also to make substantially uniform the distribution of temperature in the catalyst layer.

The reaction apparatus of the present invention is preferably used in combination with a heat-exchanger of any suitable type. In this case, the heat-exchanger is disposed within an outer cylinder of the reactor, thus making it possible to make the distribution of the temperature in the catalyst layer even more uniform.

For a better understanding of the present invention, reference is to be had to the accompanying drawings. These drawings are only for the purpose of explanation, and in no way limit the present invention.

Figure 1:
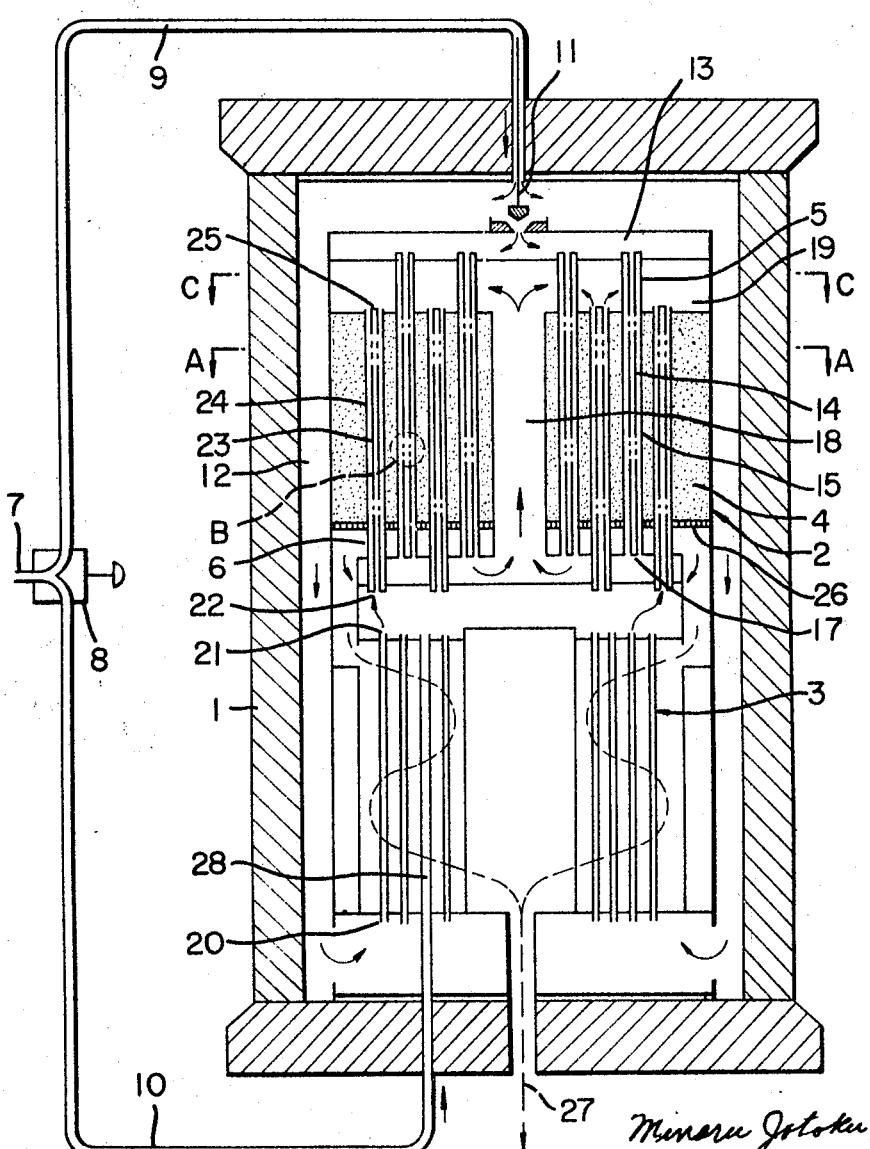
FIG. 1 is a cross-sectional view of a preferred embodiment of the present invention in which straight double cooling tubes are arranged for alternate counter-flow and parallel flow.
Figure 2:
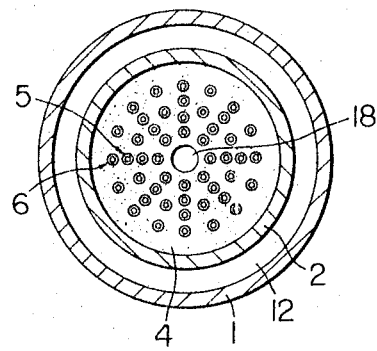
FIG. 2 is a transverse sectional view taken on line 2—2 of FIG. 1.

In FIGS. 1 and 2, a catalyst vessel 2 is disposed in the upper part of a high pressure outer casing 1 and a heat-exchanger 3 is disposed in the lower part of the casing. Parallel-flow type double cooling tubes 5 and counter-flow type double cooling tubes 6 are alternately arranged in a catalyst layer 4 which fills the cross-sectional area of the catalyst vessel 2.

Figure 3:
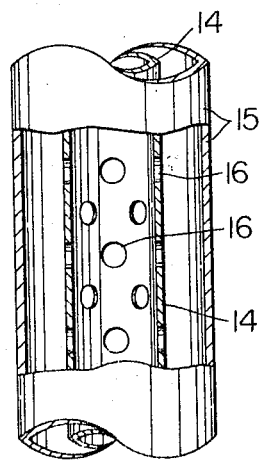
FIG. 3 is a partial plan view taken on the line 3—3 of FIG. 1.
Figure 4:
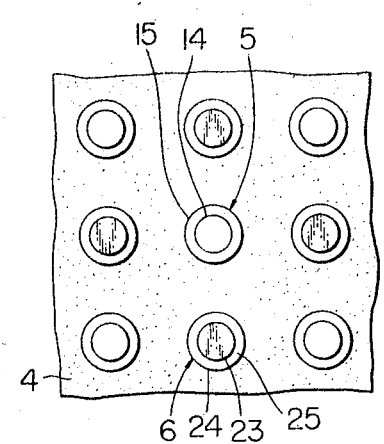
FIG. 4 is an elevation view on an enlarged scale and partially broken away of part B of the reaction apparatus of FIG. 1, i.e., a part where openings on the inside cooling tube are provided.

The parallel-flow cooling tubes 5 each consist of an inner tube 14 and an outer tube 15. The inner tube 14 has openings or pores 16 therein at intervals spaced along the length of the tube 14, as shown in FIG. 3. The counter-flow cooling tube 6, likewise consists of an outer tube 24 and an inner tube 23 provided with openings as shown in FIG. 4. As shown in FIG. 1, the feed gas outlet 25 of the counter-flow type cooling tube 6 opens on the upstream or gas-introducing side 19 of the catalyst layer 4 and on this side the end of the inner tube 23 is closed. The feed gas inlet 22 of the inner tube 23 is disposed at the opposite end of the tube 23 from the side 19 of the catalyst layer 4. On the other hand, the parallel-flow type cooling tubes 5 are arranged the reverse of the counter-flow type cooling tubes 6, i.e. with the feed gas inlet for the inner tube 14 at the side 19 of the catalyst layer and the gas outlet of the outer tube 15 at the downstream side of the catalyst layer.

The feed gas enters through a supply pipe 7 and a distributing valve 8 by which it is divided into two streams, one of which flows through a pipe 9 and the other flows through a pipe 10. The stream passing through a pipe 9 is divided into two streams by means of a second distributing or throttle valve 11. One of the latter streams flows directly into the inlet of the inner tube 14 of the parallel-flow type cooling tube 5. The other stream passes through an annular passage 12 formed between the inner wall of the outer casing 1 and the other wall of the catalyst vessel 2 and the heat-exchanger 3, and then into a feed gas inlet 20 of the heat-exchanger 3, through the heat-exchanger where it is pre-heated, and then out of outlets 21 and finally reaches the inlets 22 of the inner tube of the counter-flow type cooling tubes 6.

In the meantime, the stream passing through the pipe 10 flows through a by-pass tube 28 and into the inlets 22 of the counter-flow type cooling tubes 6 where it is mixed with the stream which has arrived through the tubes of the heat-exchanger 3. By controlling the distributing valves 8 and 11, it is possible to control the temperature of the feed gas supplied to the counter-flow type cooling tubes 6. The gas fed into the inlets 22 of the counter-flow type cooling tubes 6 flows upwards within the inner tube 23 in each tube, through openings 16 spaced along the length of the wall of the inner tube at intervals from the inlet 22, and further flows upwardly through an annular cross-section cooling passage formed between the outer tube 24 and the inner tube 23. It cools a reaction gas which is within the catalyst layer 4 by taking up heat through the wall of the outer tube 24 and flows from the feed gas outlets 25 to the upstream surface 19 of the catalyst layer.

In the meantime, the gas fed into the inner tubes 14 of the parallel-flow type cooling tubes 5 flows downward through the inner tubes 14 and passes through the openings 16 provided in the inner tubes 14, flows on downwardly through the annular cooling passages formed between the outer tubes 15 and the inner tubes 14, and cools the catalyst layer 4 by taking up heat through the walls of the outer tubes 15 and comes to the feed gas outlets 17. The feed gas which emerges from the outlets 17 rises through a central passage 18 which extends through the center of the catalyst layer, and flows to the upstream surface of the catalyst layer.

The feed gases which have gone through the double cooling tubes 5 and 6 have been pre-heated to the temperature at which the reaction is initiated and are mixed with each other at the upper surface 19 of the catalyst layer. Thereafter, the feed gas is reacted while proceeding downward through the fixed catalyst layer 4, and the reaction product proceeds in the direction of the arrow through a catalyst support 26, passes through the heat-exchanger 3, and is taken out of the vessel through a reaction product outlet 27.

Figure 5:
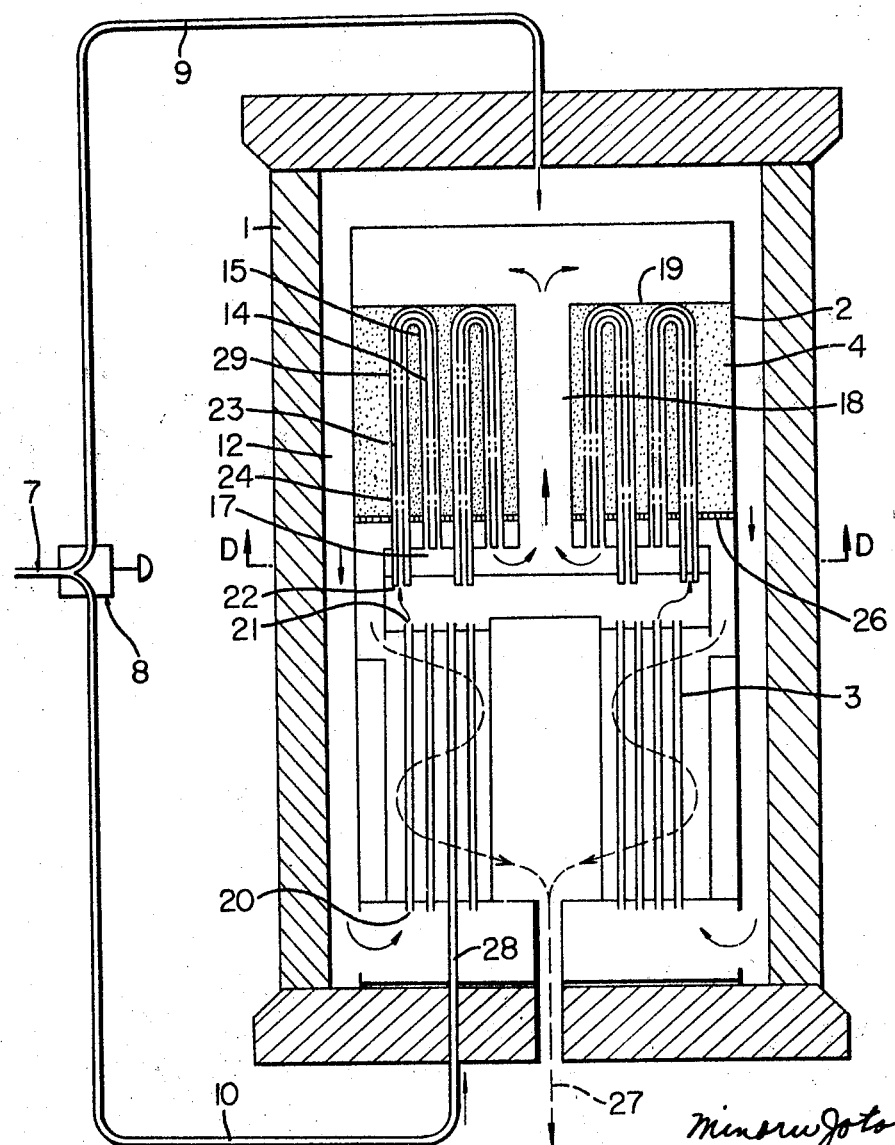
FIG. 5 is a cross-sectional view of another preferred embodiment of the present invention wherein U-shaped double cooling tubes are provided.

In the embodiment shown in FIG. 5, in which identical parts have the same numbers, the construction is roughly the same as in the embodiment shown in FIG. 1 except that U-shaped cooling tubes 29 are provided as the cooling tubes and are positioned such that the feed gas inlets 22 and outlets 17 of the said cooling tubes are both positioned on the opposite side of the catalyst layer 43 from the upstream or gas-introducing side 19.

Figure 6:
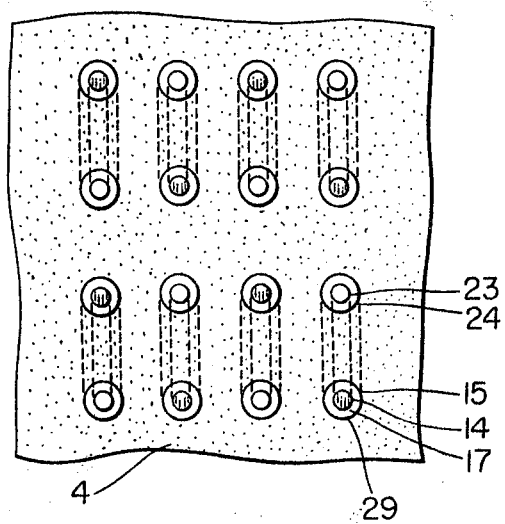
FIG. 6 is a partial plan view taken on the line 6—6 of FIG. 5.

Each U-shaped cooling tube 29 consists of a counter-flow type portion 23 of the inner tube having a feed gas inlet 22 at the bottom of the catalyst layer and openings provided in the wall and spaced at certain intervals along the wall from the said inlet, and a counter-flow type portion 24 of the outer tube, a parallel-flow type portion 14 of the inner tube closed at the bottom of the catalyst layer and having openings provided along the length of the wall thereof, and a parallel-flow type portion 15 of the outer tube, the said portion 23 and the said portion 24 being connected respectively to the said portions 14 and 15. The annular passage formed between the parallel-flow type portion 14 of the inner tube and the parallel-flow type portion 15 of the outer tube has a feed gas outlet 17 at the bottom of the catalyst layer as shown in FIG. 6.

The feed gas flows through the pipe 7 and the distributor valve 8 and is divided into two streams, one of which flows through the pipe 9 and the other of which flows through the pipe 10. The stream passing through the pipe 9 flows downwardly through the annular passage 12 formed between the inner wall of the casing 1 and the outer wall of the catalyst vessel 2 and the heat-exchanger 3, and is pre-heated while passing from the gas inlet 20 of the heat-exchanger 3 through the heat-exchanger, emerges from the outlet 21 and flows to the gas inlets 22 of the U-shaped cooling tubes 29.

In the meantime, the stream passing through the pipe 10 flows through the by-pass tube 28 and flows to the gas inlets 22 of the U-shaped cooling tubes 29 where it is mixed with the stream which has gone through the heat-exchanger. By controlling the distributor valve 8, it is possible to control the temperature of the feed gas to be supplied to the U-shaped cooling tubes.

The feed gas fed into the inlets 22 of each of the U-shaped cooling tubes flow upwardly in the counter-flow portion 23 of the inner tube. A part of it flows through the openings provided in the wall of the inner tube 23, flows upwardly in the annular cooling passage formed between the counter-flow portion 24 of the outer tube and the counter-flow portion 23 of the inner tube, and cools the catalyst layer 4 by taking up heat through the wall of the outer tube. This cooled gas turns in its direction of flow at the upper portion of the catalyst layer, flows through an annular cooling passage between the parallel-flow portion 15 of the outer tube and the parallel flow portion 14 of the inner tube, and emerges from the gas outlet 17. On the other hand, the remaining gas flowing through the counter-flow portion 23 of the inner tube turns in its direction of flow at the upper portion of the catalyst layer, flows downwardly through the parallel-flow portion 14 of the inner tube, flows out into a parallel-flow annular passage through the openings provided in the wall of the inner tube, and joins the said cooling gas and further cools the catalyst layer 4 by taking up heat through the outer tube 15.

The feed gas which emerges from the outlets 17 rises through the central passage 18 and flows to the upper portion 19 of the catalyst layer. The feed gas which has gone through the cooling tube is pre-heated to a temperature at which the reaction is initiated. It is reacted while proceeding downwardly through the interior of the fixed catalyst layer, and the reaction product flows in the direction of the arrow, and is taken out of the system through the reaction product outlet 27 after passing through the heat-exchanger 3.

The apparatus of the present invention is especially suited for the preparation of ammonia and methanol at high temperature and high pressure, and it is possible to maintain the distribution of temperature in the catalyst layer substantially uniform.

Figure 7:
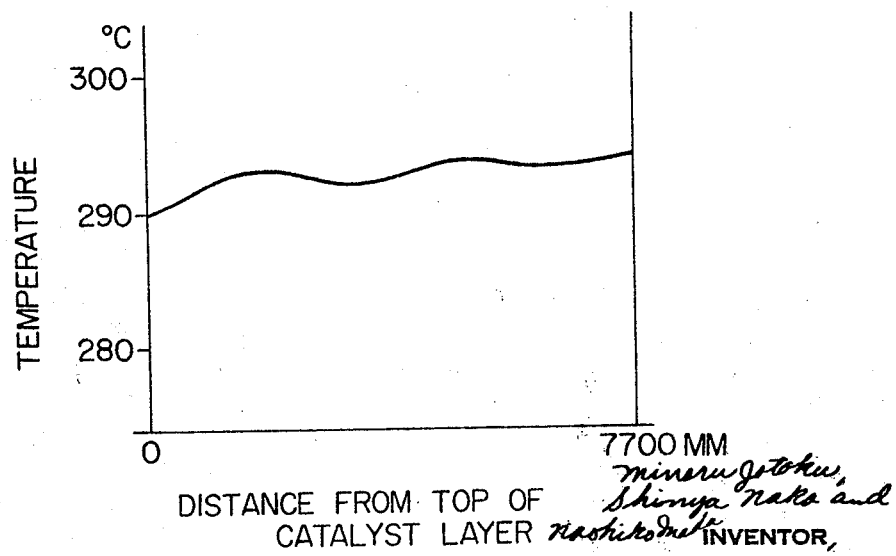
FIG. 7 is a diagram showing a distribution of temperature in a catalyst layer when the reaction apparatus of FIG. 1 is used for the preparation of methanol.

FIG. 7 shows the distribution of the temperature reaction in the catalyst layer when the apparatus of the present invention is used for the preparation of methanol, and it is clear from this figure that the fluctuation of the reaction temperature is within a range of 5° C.

What we claim is:

1. A self-heat exchange type apparatus comprising a fixed catalyst layer for carrying out an exothermic catalytic gaseous reaction, a plurality of cooling tubes in said layer, each of said cooling tubes consisting of an outer tube, and an inner tube within said outer tube, said inner tube having an inlet for a feed gas at one end, being closed at the other end, and having openings in the wall thereof spaced along the wall at intervals from the said inlet, said outer tube being spaced from the periphery of the said inner tube and defining an annular cross-section cooling passage between the inner tube and the outer tube, said outer tube having an outlet for the feed gas at the end opposite to the said inlet in said inner tube and being closed at the other end, and said inlet and outlet for the feed gas of said cooling tubes extending outwardly of said fixed catalyst layer.

2. A self-heat exchange type apparatus as claimed in claim 1, in which each of the said cooling tubes is straight, and extends through a fixed catalyst layer.

3. A self-heat exchange type apparatus as claimed in claim 1, in which each of the said cooling tubes has the inlet end of the inner tube at the downstream surface of the catalyst layer and the outlet end of the outer tube at the upstream face of the catalyst layer, so that the flow through the cooling tube is in counter-flow to the flow of the reacting gas in the said catalyst layer.

4. A self-heat exchange type apparatus as claimed in claim 1, in which a portion of said plurality of tubes has the inlet ends of the inner tubes at the downstream face of said catalyst layer and the outlet ends of the outer tubes at the upstream face of the catalyst layer, and the remainder of said plurality of tubes is in the reverse position from the position of said portion of said plurality of tubes so that the gas flow through the said cooling tubes is partly in counter-flow and partly in parallel-flow to the flow through said catalyst layer, said oppositely oriented tubes being arranged in an alternate and symmetrical manner; and said catalyst layer having a central passage therethrough for conducting the feed gas from the outlet ends of the said parallel-flow type cooling tubes to the upstream face of the catalyst layer.

5. A self-heat exchange type apparatus as claimed in claim 4 further comprising a pressure vessel in which said catalyst layer is fixedly mounted, a heat exchanger mounted in said pressure vessel downstream of said catalyst layer, said catalyst layer and heat exchanger being spaced from the wall of the pressure vessel to define an annular passage along the wall of the pressure vessel, and conduit means extending through said heat exchanger between the annular passage along the wall of the pressure vessel and the inlet ends of said portion of said plurality of tubes.

6. A self-heat exchange type apparatus as claimed in claim 5 further comprising a valve for dividing a stream of the said feed gas, further conduit means extending from said valve to the inlet of the remainder of said cooling tubes, and still further conduit means extending from the valve to the annular passage between the said pressure vessel and the said catalyst vessel; and a by-pass feed gas pipe extending to the inlets of said portion of said cooling tubes through the said heat-exchanger.

7. A self-heat exchange type apparatus as claimed in claim 1, in which said cooling tubes are U-shaped and the inlet and outlet of each of the said cooling tubes project outward of the said catalyst layer.

8. A self-heat exchange type apparatus as claimed in claim 7, in which the inlet and outlet of the said cooling tubes project at the downstream face of the said catalyst layer; and said catalyst layer has a central passage therein for conducting collectively the feed gas from the outlet of each of the said cooling tubes to the upstream face of the said catalyst layer.

9. A self-heat exchange type apparatus as claimed in claim 8 further comprising a pressure vessel in which said catalyst layer is fixedly mounted, a heat exchanger mounted in said pressure vessel downstream of said catalyst layer, said catalyst layer and heat exchanger being spaced from the wall of the pressure vessel to define an annular passage along the wall of the pressure vessel, and conduit means extending through said heat exchanger between the annular passage along the wall of the pressure vessel and the inlet ends of said plurality of tubes.

10. A self-heat exchange type apparatus as claimed in claim 9, and a by-pass pipe extending through said heat exchanger to the inlets of said pipes for a part of the feed gas.

11. A self-heat exchange type apparatus comprising a fixed catalyst layer for carrying out an exothermic catalytic gaseous reaction; a plurality of cooling tubes in said layer; each of said cooling tubes including an outer tube, and an inner tube within said outer tube; said inner tube having an inlet for a feed gas at one end, being closed at the other end, and having openings in the wall thereof spaced along the wall at intervals from the said inlet; said outer tube being spaced from the periphery of the said inner tube and defining an annular cross-sectional cooling passage between the inner tube and the outer tube; said outer tube having an outlet for the feed gas at the end opposite to the said inlet in said inner tube and being closed at the other end; said inlet and outlet for the feed gas of said cooling tubes extending outwardly of said fixed catalyst layer; and said cooling tubes being arranged in said fixed catalyst layer in a manner whereby the gas flow through the said cooling tubes is partly in counter-flow and partly in parallel-flow to the flow through said catalyst layer.

References Cited

UNITED STATES PATENTS

| | | | |
|---|---|---|---|
| 1,909,378 | 5/1933 | Richardson | 23—289 X |
| 1,927,493 | 9/1933 | Hechenbleikner | 23—288 |
| 1,942,817 | 1/1934 | Jaeger | 23—288 |
| 2,092,017 | 9/1937 | Prickett | 23—288 |
| 2,384,858 | 9/1945 | Thayer et al. | 23—288 X |
| 3,270,807 | 9/1966 | Steadman | 165—174 |

JOSEPH SCOVRONEK, Primary Examiner

U.S. Cl. X.R.

23—288; 165—174